(12) United States Patent  (10) Patent No.: US 8,360,113 B2
Williams  (45) Date of Patent: Jan. 29, 2013

(54) MULTI-COLORED ADHESIVE WITH OPALESCENT AND METALLIC COLORED PARTICLES AND METHOD OF MAKING SAME

(75) Inventor: Tracia Williams, Coral Springs, FL (US)

(73) Assignee: Advantus, Corp., Jacksonville, FL (US)

( * ) Notice: Subject to any disclaimer, the term of this patent is extended or adjusted under 35 U.S.C. 154(b) by 1077 days.

(21) Appl. No.: 12/212,704

(22) Filed: Sep. 18, 2008

(65) Prior Publication Data

US 2010/0065148 A1  Mar. 18, 2010

(51) Int. Cl.
*B65B 1/04*  (2006.01)
(52) U.S. Cl. ............... 141/9; 141/2; 141/105; 222/106; 222/212
(58) Field of Classification Search .................. 141/268, 141/284, 374, 263, 234, 100, 2, 9, 105; 222/92, 222/106, 212, 213, 94–99
See application file for complete search history.

(56) References Cited

U.S. PATENT DOCUMENTS

| | | | |
|---|---|---|---|
| 1,951,694 A | | 3/1934 | Goulstone |
| 2,970,083 A | | 1/1961 | Bell |
| 3,267,971 A | * | 8/1966 | Mueller ........................ 141/9 |
| 3,479,429 A | * | 11/1969 | Biamonte et al. ............. 424/63 |
| 3,509,920 A | * | 5/1970 | Word Kenneth C .......... 141/100 |
| 3,559,700 A | | 2/1971 | Erickson |
| 3,980,767 A | | 9/1976 | Chown |
| 4,136,720 A | | 1/1979 | Kinney |
| 4,159,028 A | * | 6/1979 | Barker et al. ................... 141/9 |
| 4,265,948 A | * | 5/1981 | Hayes et al. .................. 222/92 |
| 4,335,103 A | | 6/1982 | Barker et al. |
| 4,370,945 A | | 2/1983 | Beckschulte et al. |
| 4,966,205 A | * | 10/1990 | Tanaka ............................. 141/9 |
| 5,294,657 A | * | 3/1994 | Melendy et al. ............. 524/270 |
| 5,307,954 A | * | 5/1994 | Gick et al. ..................... 222/94 |
| 5,388,727 A | * | 2/1995 | Jouillat ........................... 222/94 |
| 5,615,803 A | * | 4/1997 | Hatakeyama et al. ......... 222/94 |
| 5,775,386 A | * | 7/1998 | Connan ........................ 141/103 |
| 5,954,234 A | * | 9/1999 | Connan et al. ................. 222/94 |
| 6,056,463 A | * | 5/2000 | Nishio et al. ................... 401/47 |
| 6,126,923 A | * | 10/2000 | Burke et al. .................... 424/49 |
| 6,213,166 B1 | | 4/2001 | Thibiant et al. |
| 6,367,519 B2 | | 4/2002 | Thibiant et al. |
| 6,516,838 B2 | * | 2/2003 | Thibiant et al. .............. 141/100 |
| 6,532,634 B2 | * | 3/2003 | Wilson-Brokl ................... 27/1 |
| 6,688,495 B2 | * | 2/2004 | Masuda ......................... 222/92 |
| 6,732,888 B1 | * | 5/2004 | Smiley et al. ................ 222/485 |
| 7,435,027 B2 | * | 10/2008 | Hetzel ............................. 401/47 |
| 7,445,131 B2 | * | 11/2008 | Pottish et al. ..................... 222/1 |
| 7,559,346 B2 | * | 7/2009 | Herrick et al. ............... 141/105 |
| 7,851,522 B2 | * | 12/2010 | Hardy et al. ................... 524/36 |
| 7,946,452 B2 | * | 5/2011 | Hantman et al. ............... 222/94 |
| 7,971,752 B2 | * | 7/2011 | Truxes ............................ 222/92 |
| 7,976,234 B2 | * | 7/2011 | May ............................. 401/132 |
| 8,016,162 B2 | * | 9/2011 | Cleary et al. ................. 222/215 |
| 2003/0064186 A1 | * | 4/2003 | Mourtada Anselmo et al. ........................... 428/35.7 |

(Continued)

Primary Examiner — Timothy L Maust
(74) Attorney, Agent, or Firm — Arthur G. Yeager

(57) ABSTRACT

A multi-colored swirled glitter glue product packaged and sold in a transparent package is disclosed. When dispensed from the packaging and onto the adherent, the multi-colored glitter glue is dispersed with generally equal parts of each color. Each color is formulated with glitter particles which results in a colorful display of glitter enhanced glue product. The swirled nature of the composition is easily viewed through clear pliable plastic bottling, which generates more appeal and interest than the prior art of plain glue lacking either color or glitter properties.

4 Claims, 5 Drawing Sheets

U.S. PATENT DOCUMENTS

| | | | |
|---|---|---|---|
| 2003/0080140 A1* | 5/2003 | Neas et al. | 222/1 |
| 2003/0080146 A1* | 5/2003 | Moros et al. | 222/1 |
| 2004/0232169 A1* | 11/2004 | Glover et al. | 222/212 |
| 2005/0109796 A1* | 5/2005 | Bourque et al. | 222/94 |
| 2005/0137320 A1* | 6/2005 | Melancon et al. | 524/563 |
| 2005/0155987 A1* | 7/2005 | Py et al. | 222/212 |
| 2006/0113318 A1* | 6/2006 | May et al. | 222/94 |
| 2006/0131341 A1* | 6/2006 | Tsai | 222/213 |
| 2006/0249534 A1* | 11/2006 | Sainz | 222/92 |
| 2007/0095721 A1* | 5/2007 | Davis et al. | 206/581 |
| 2007/0253761 A1* | 11/2007 | May | 401/133 |
| 2007/0267438 A1* | 11/2007 | Wijerama | 222/101 |
| 2008/0029548 A1* | 2/2008 | De Wree et al. | 222/212 |
| 2008/0142544 A1* | 6/2008 | Pottish et al. | 222/92 |
| 2008/0196787 A1* | 8/2008 | Comstock et al. | 141/9 |
| 2008/0247970 A1* | 10/2008 | Gantenberg | 424/49 |
| 2008/0257909 A1* | 10/2008 | Wang et al. | 222/92 |
| 2009/0008103 A1* | 1/2009 | Cordani | 169/30 |
| 2009/0060957 A1* | 3/2009 | Glandorf et al. | 424/400 |
| 2011/0155761 A1* | 6/2011 | Mamiye | 222/94 |
| 2011/0210145 A1* | 9/2011 | Fournier et al. | 222/92 |
| 2011/0220679 A1* | 9/2011 | Mamiye | 222/92 |
| 2011/0297703 A1* | 12/2011 | Wilson et al. | 222/212 |

\* cited by examiner

MULTI-COLORED ADHESIVE WITH OPALESCENT AND METALLIC COLORED PARTICLES AND METHOD OF MAKING SAME

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to multi-colored adhesive formulations combined with light reflecting particles, particularly suited for use in performing arts and crafts, and more particularly to such a multi-colored adhesive formulation produced and packaged in a swirl configuration and a method of producing such products.

2. Description of Related Art

Several elements of prior art relate to the present invention, namely adhesives and light reflecting particles commonly referred to as "glitter". Both adhesives and glitter have been utilized throughout history by various persons throughout the world. Adhesives initially consisted of natural gums, plant resins and/or saps. These agents were first used for the creation of weaponry, furniture and transportation projects. Decorating with adhesives developed during the medieval times in conjunction with the emergence of gold leaf appliqué techniques. As various uses for a bonding agents were discovered, there have been many improvements in flexibility, composition, and chemical resistance. Today, adhesives are categorized as being natural or synthetic products, with certain formulations being available for specific purposes. Typical glue adhesives, such as white glue or rubber cement, are created from a mixture of ingredients, typically polymers, dissolved in a solvent. Adhesive qualities are realized as the solvent evaporates, allowing the polymers to harden and adhere to the surface.

Glitter was developed in the early 1900's as an assortment of very small specks of glass, paper or plastic, painted in iridescence or metallic to reflect light in a broad spectrum of colors. Mostly decorative in function, this component has been added to cosmetics, body lotions, clothing apparel, and holiday decorations. As the popularity of decorative arts, commonly known as crafts, has grown, the interest of applying glitter to objects by use of an adhesive has expanded. Traditionally, in order to adhere glitter to a particular surface, the use of an adhesive compound was required. The glue would be applied, and prior to the evaporation of solvents and the hardening process, glitter was sprinkled over the bonding agent. Once the solvents were dispersed into the air, the glitter would be "stuck" in the adhesive. This process has been used on countless craft projects, often by children and adults alike.

More recently, products combining the properties of adhesive and glitter into one product have been developed. Such invention enhanced the possibilities in arts and crafts in that a two-step process could now be achieved in one step. Additionally, this art enhanced the popularity of such products which has grown rapidly amongst schoolchildren and artists. The glitter glue product known in the art, while colorful and functional, does not overcome the limitation of a single-colored glue containing glitter. There remains a need for improvements in the art of glitter glue that advances the art by providing a multi-colored glitter glue composition specifically packaged in a container and swirled together, with each color maintaining its own integrity of color.

BRIEF SUMMARY OF THE INVENTION

The present invention overcomes the limitations and disadvantages present in the art by providing multi-colored swirled glitter glue product packaged and sold in a transparent package. When squeezed out of the packaging and onto the adherent, such multi-colored glitter glue is dispersed with generally equal parts of each color. Each color is formulated with glitter, which results in a colorful display of glitter enhanced glue product. The swirled nature of the composition is easily viewed through clear pliable plastic bottling, which generates more appeal and interest than the prior art of plain glue lacking either color or glitter properties.

Further, the method for packaging said composition in a swirled configuration within a dispensing container adapted for such particular purpose is disclosed. First and second adhesive compositions are prepared and enhanced with glitter particles thereby resulting in adhesive compositions having two distinct colors. Dual supply lines pump the adhesive compositions through a device so that generally equal parts of each color are disbursed into packaging containers. The empty containers sit upright on a turntable, each held in place by supports. Upon the clockwise rotation of the table, each container is filled individually. As a container is being filled it is slowly rotated so that the two compositions swirl together as the composition flows into the container.

Accordingly, it is an object of the present invention to provide improvements in glitter glue compositions.

Another object of the present invention is to provide a swirled glue product which concurrently features glitter and multi-colored properties.

Still yet another object of the present invention is to allow the product to be applied to the adherent with simultaneous disbursement of two glittery colors.

Another object of the present invention is to provide an apparatus and method for efficiently filling the packaging of the product.

These and other objects are met by the present invention which will become more apparent from the accompanying drawings and the following detailed description of the drawings and preferred embodiments.

DETAILED DESCRIPTION OF THE INVENTION

Figure 2:
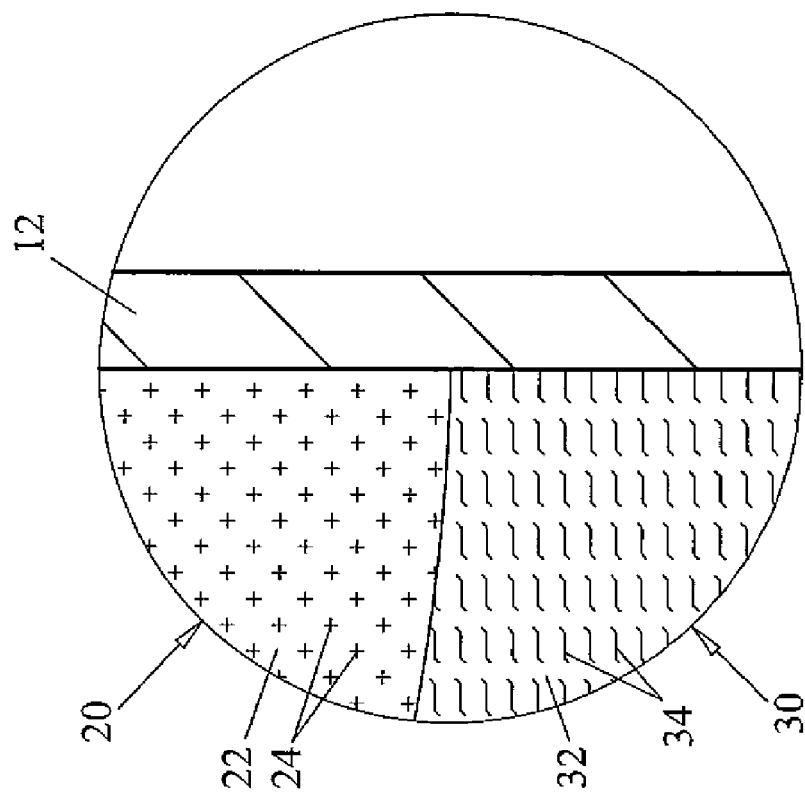
FIG. 2 is a magnified partial detail view thereof.
Figure 1:
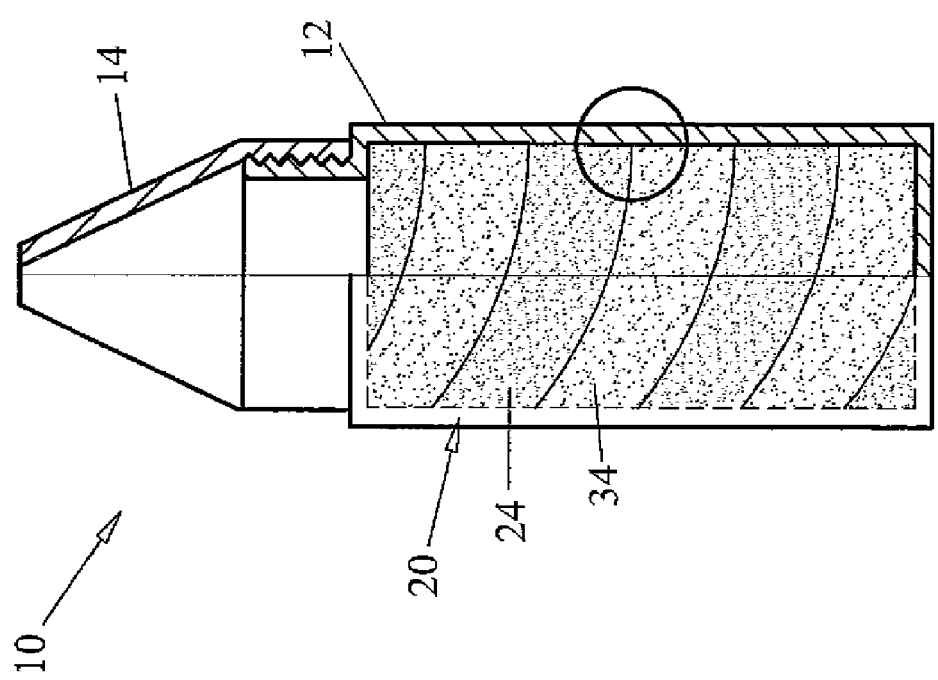
FIG. 1 is a half-sectioned view of a multi-colored, glitter-containing adhesive product packaged in accordance with the present invention.
Figure 3:
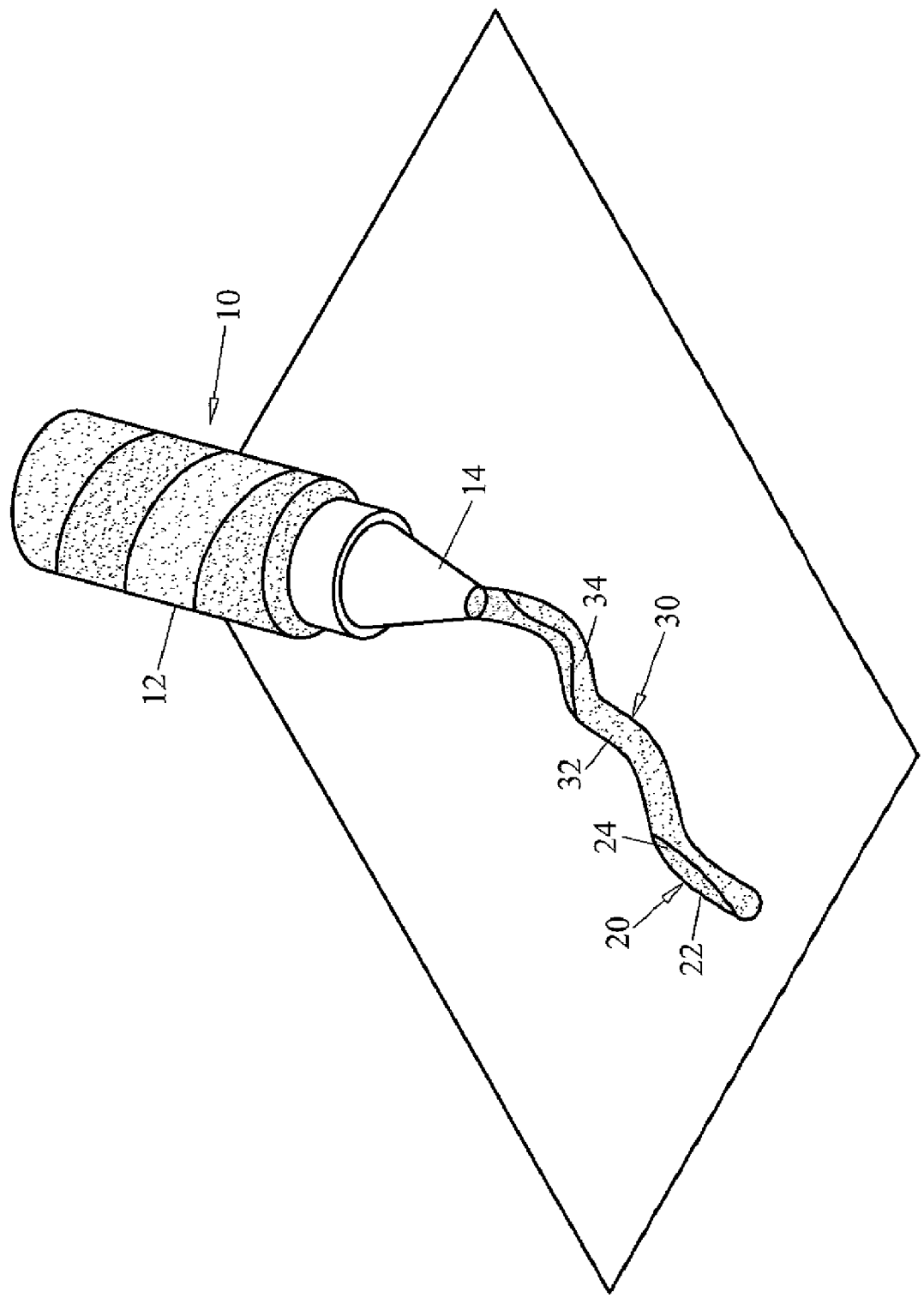
FIG. 3 illustrates dispensing of multi-colored, glitter-containing adhesive product on an adherent surface.

With reference now to the drawings, FIGS. 1-3 depict a preferred embodiment of a multi-colored adhesive product, generally referenced as 10, particularly useful in arts and crafts projects. In accordance with a preferred embodiment, a multi-colored adhesive product is packaged and sold in a transparent container 12 having a dispensing cap 14. The multi-colored adhesive comprises first and second differently colored, glitter-containing adhesive compositions, referenced as 20 and 30 respectively. Adhesive compositions 20 and 30 are each contained within transparent dispensing container 12 in a visually appealing swirl pattern that further functions to produce a multi-colored stream of glitter glue when dispensed. Cap 14 has nozzle to allow for selective dispensing of adhesive compositions 20 and 30.

As used herein the term "glitter" shall be broadly defined to mean any assortment of small particles, fragments, pieces of paper, glass, plastic, polymer (such as polyester), or any other suitable natural or synthetic substance, and particularly such substances characterized as being capable of reflecting, refracting, diffracting, or scattering light, or providing an opalescence effect. Opalescence is a type of dichroism. A dichroic material is one which causes visible light to be split up into distinct beams of different wavelengths (colors). In accordance with the preferred embodiment the glitter particles are characterized as having an opalescence effect.

In a preferred embodiment, each adhesive composition 20 and 30 includes an adhesive component, referenced as 22 and 32, having glitter particles, referenced as 24 and 34, generally uniformly dispersed and suspended therein. In a preferred embodiment, adhesive components 22 and 32 are generally clear, non-toxic, water-based adhesives that adhere to virtually any porous adherent surface. Glitter particles 24 and 34 are preferably selected to have different visual characteristics so as to create the appearance of different colors. In a preferred embodiment, adhesive compositions 20 and 30 are each contained within container 12 in a helical swirled pattern that functions to produce a multi-colored stream of glitter glue when dispensed as best illustrated in FIG. 3. The present invention thus advances the art of decorative glue by significantly reducing the number of steps required to dispense multiple glitter glue colors while creating arts and crafts projects. As illustrated in FIG. 3, when container 12 is squeezed the multi-colored swirled glitter glue product is extruded out from the dispensing end of cap 14 and onto the adherent, such multi-colored glitter glue is dispersed to varying degrees with parts of each color. The swirled nature of the composition is easily viewed through clear pliable plastic bottling, which generates more appeal and interest than the prior art of plain glue lacking either color or glitter properties. While the preferred embodiment discloses a multi-colored swirled glitter glue composition consisting of two colors, such as red and blue, the present invention contemplates alternate color formulations and formulations with more than two colors.

As best seen in FIGS. 4-7, the present invention further discloses a method of producing a swirled glitter glue product as disclosed above. In accordance with a preferred embodiment of said method a filling machine, generally referenced as 40, is disclosed. In addition, glitter is combined with adhesive to form first and second "glitter glue" supplies of differing and preferably contrasting colors. The first and second glitter glue supplies are initially contained within corresponding first and second barrel containers (not shown). As the adhesive is not set the glitter glue is flowable. Tubular flexible supply lines, referenced as 42 and 44 run from each container to filling machine 40.

Filling machine 40 includes dual outlet fill nozzle 46 having first and second inlets and outlets. Each nozzle inlet is in fluid communication with one of said glitter glue supply barrels via one of said supply lines 42 and 44. Nozzle 46 is fixed to a movable carriage 48 which is selectively movable along a track 49 in a generally vertical direction between upper and lower positions. Nozzle 46 is disposed in overhead relation with a rotary index material handling and positioning apparatus, generally referenced as 50, having a rotating circular top 52 defining a daisy wheel structure with a peripheral edge that defines a plurality radially inwardly projecting concave notches 54 sized for receiving bottles during the filling process.

Figure 4:
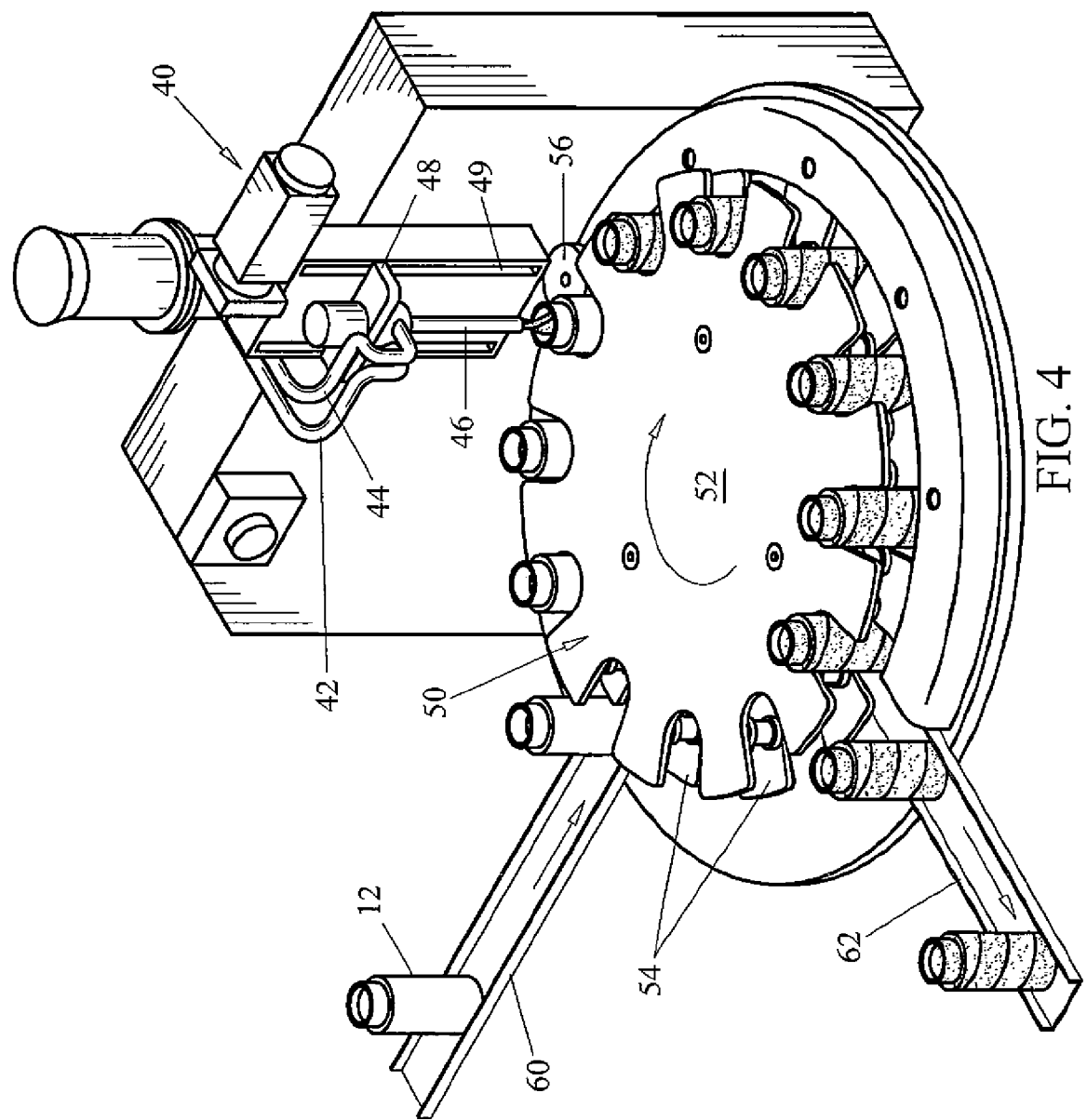
FIGS. 4 and 5 are top perspective views illustrating a filling machine in accordance with the present invention.
Figure 5:
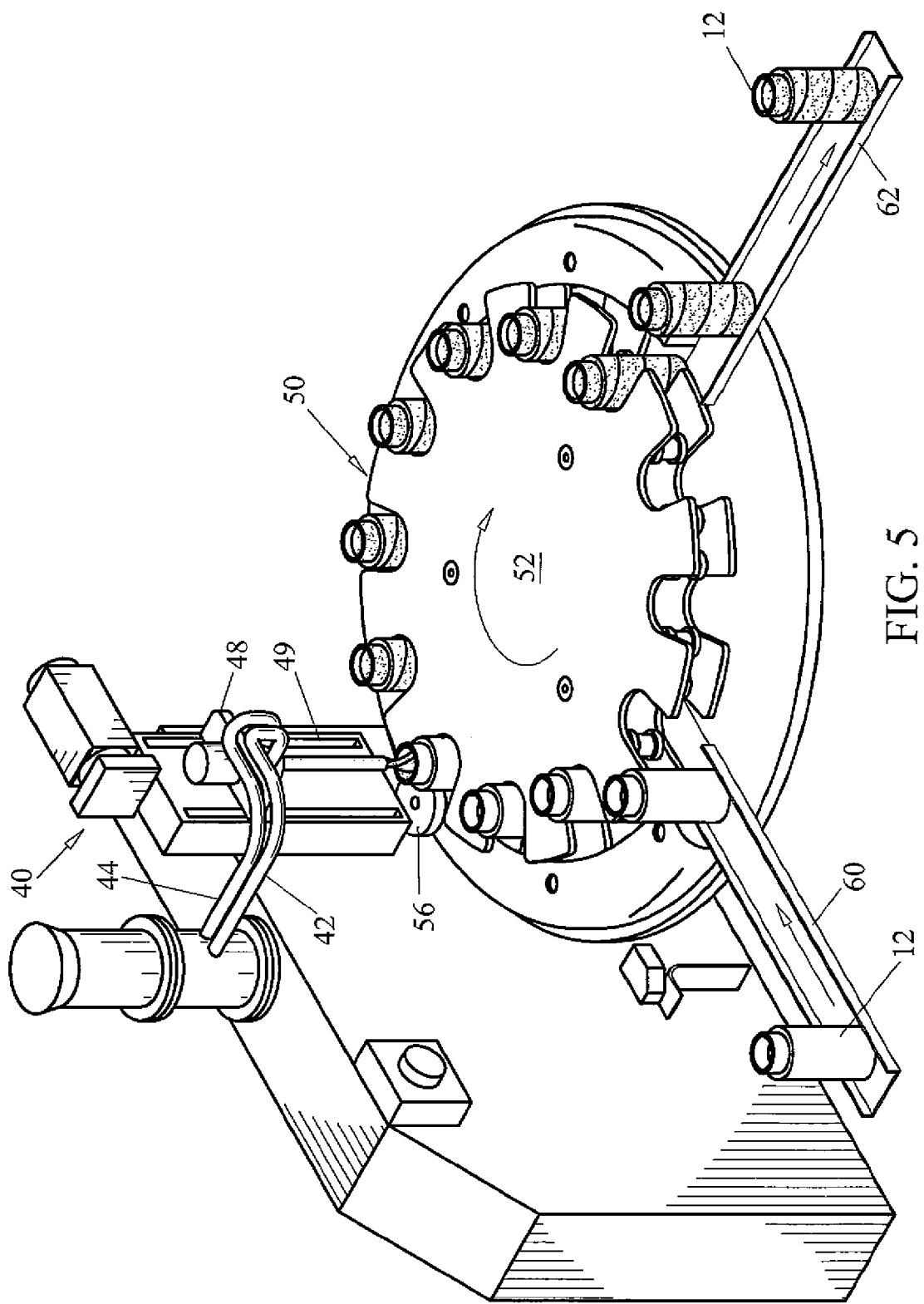
Figure 7:
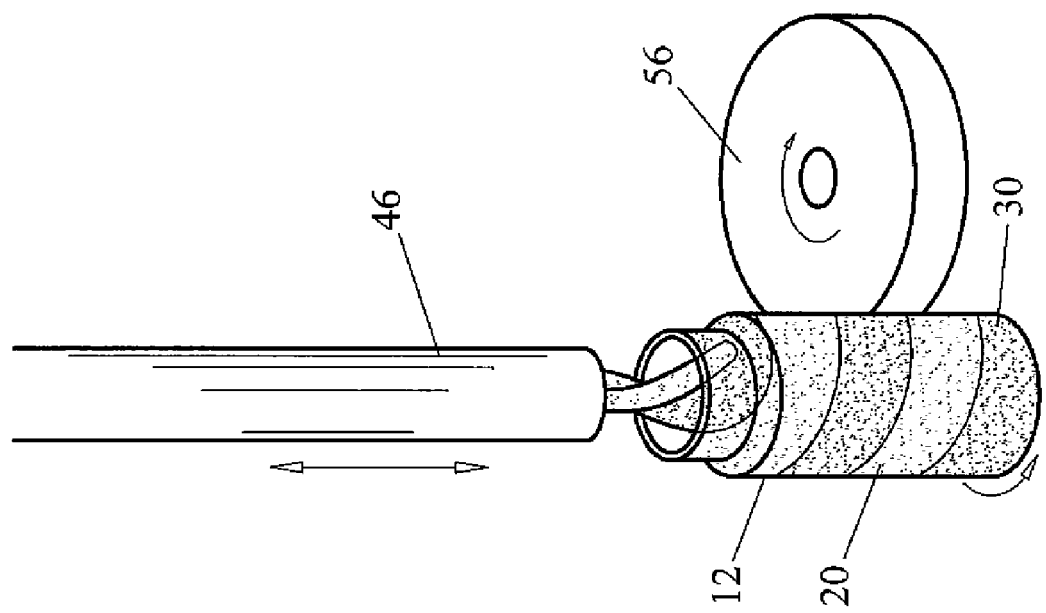
FIGS. 6 and 7 are partial detail views illustrating the filling of a container with glitter glue in accordance with the present invention.
Figure 6:
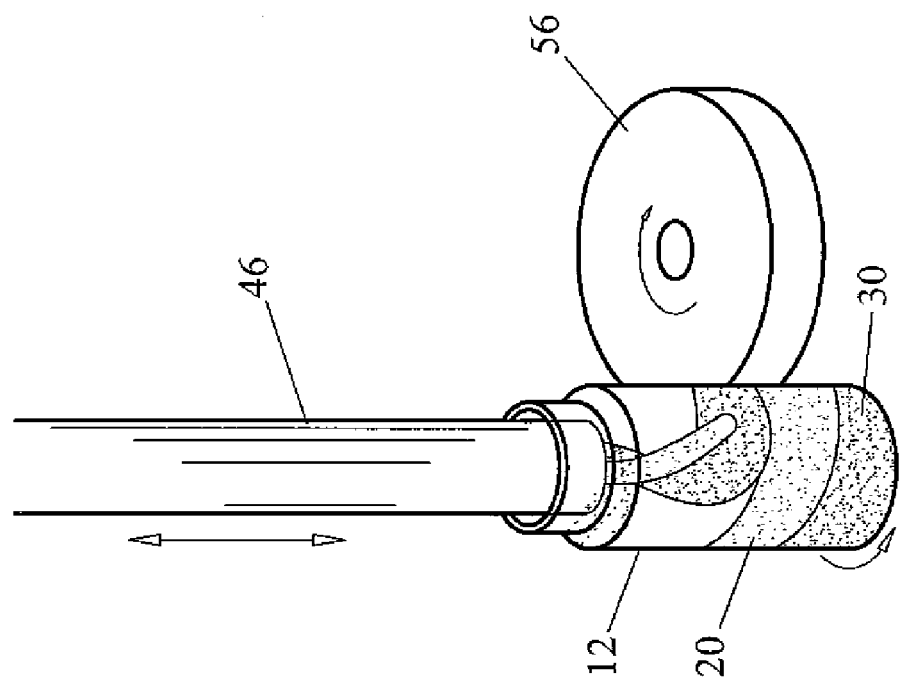

A first flat belt conveyor 60 provides a supply of empty bottles 12 to the rotary index material handling apparatus 50, and bottles 12 are received within peripheral edge notches 54 formed on the rotary index material handling apparatus as best illustrated in FIG. 4. As the rotating circular top 52 of the rotary index apparatus 50 turns in a clockwise direction, bottles 12 are positioned, one at a time, in position under the fill nozzle 46. Once in position, the fill nozzle carriage 48 traverses to the lower position whereby fill nozzle 46 is inserted into the container such that the tip thereof is in close proximity to the container floor. A spinning wheel 56 then engages the side of the bottle thereby causing the bottle to rotate. While the bottle is rotating streams of differently colored glitter glue are injected into the bottle from the fill nozzle's dual outlet while at the same time the nozzle carriage 48 moves from its lower position toward its upper position along guide track 49. The combination bottle rotation with the synchronized upward movement of nozzle 46 results in filling container 12 with two streams of differently colored glitter glue formed in the shape of a helical swirl.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of dispensing an artistic multi-colored small stream or bead of glitter adhesive wherein a first composition includes an adhesive with a first color glitter particles generally uniformly dispersed therein and a second composition includes an adhesive with a second color glitter particles of a color different from the first color generally uniformly dispersed therein, which method comprises, A) simultaneously filling the first and second compositions in a transparent and squeezable container, having a reduced neck and discharge opening, in a helically swirled configuration while maintaining their own respective integrity of color without any separation of the compositions in the container;

B) storing the compositions in the container;

C) providing a conical cap having an enlarged opening adjacent to and connected to the neck and tapering to a small opening at its free end to permit flow of the both of the compositions through the discharge opening via the conical cap and such compositions exiting the small opening as a small stream or bead from the container; and D) squeezing the container while moving the container along a predetermined course on an adherent surface to produce a flow from the container of an artistic multi-colored small stream or bead of both of the glitter adhesives.

2. The method according to claim 1 wherein the artistic multi-colored steam or bead of both adhesives is formed of generally equal parts of each composition.

3. A method of dispensing an artistic multi-colored small stream or bead of adhesive wherein a first composition includes an adhesive of a first color and a second composition includes an adhesive of a second different color, which method comprises,
- A) simultaneously filling the first and second compositions in a transparent and squeezable container having a reduced neck and discharge opening in a helically swirled configuration while maintain their own respective integrity of color and without any separation of the compositions in situ within the container;
- B) storing the compositions in the container;
- C) providing a conical cap having an enlarged opening adjacent to and connected to the neck and tapering to a small opening at its free end to permit flow of both of the compositions through the discharge opening via the conical cap and the flow exiting the small opening as a small stream or bead of both of the compositions from the container; and
- D) squeezing the container while moving the container along a predetermined course on an adherent surface to produce a flow from the container through the small opening of an artistic multi-colored small stream or bead of both adhesives.

4. The method according to claim 3 wherein the artistic multi-colored steam or bead of both adhesives is formed of generally equal parts of each of the compositions.

* * * * *